United States Patent
Ferreira et al.

(10) Patent No.: US 9,388,726 B2
(45) Date of Patent: Jul. 12, 2016

(54) DELIVERY UNIT FOR A LIQUID ADDITIVE AND MOTOR VEHICLE HAVING A DELIVERY UNIT

(71) Applicant: EMITEC GESELLSCHAFT FUER EMISSIONSTECHNOLOGIE MBH, Lohmar (DE)

(72) Inventors: Julie Ferreira, Metz (FR); Frederic Supernat, Dieuze (FR); Badoual Loic, Malzéville (FR); Philippe Mertes, Faulquemont (FR); Eric Fiorucci, Les Etangs (FR); Georges Maguin, Marly (FR)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 14/665,147

(22) Filed: Mar. 23, 2015

(65) Prior Publication Data
US 2015/0192053 A1 Jul. 9, 2015

Related U.S. Application Data

(63) Continuation of application No. PCT/EP2013/069543, filed on Sep. 20, 2013.

(30) Foreign Application Priority Data

Sep. 21, 2012 (DE) .................. 10 2012 108 942

(51) Int. Cl.
*F01N 13/00* (2010.01)
*F01N 3/28* (2006.01)
*F01N 3/20* (2006.01)

(52) U.S. Cl.
CPC .............. *F01N 3/2896* (2013.01); *F01N 3/206* (2013.01); *F01N 3/208* (2013.01); *F01N 2260/10* (2013.01); *F01N 2530/22* (2013.01); *F01N 2610/01* (2013.01); *F01N 2610/14* (2013.01); *F01N 2610/1486* (2013.01)

(58) Field of Classification Search
CPC .............. F01N 3/2066; F01N 2610/02; F01N 2610/1406; F01N 2610/1493; F16L 55/05; F16L 55/053; F16L 55/054
USPC .................. 60/286, 295, 301; 138/26, 30
See application file for complete search history.

(56) References Cited

U.S. PATENT DOCUMENTS

| 7,219,698 B2 | 5/2007 | Mayer | |
| 2004/0101450 A1* | 5/2004 | Mayer | B01D 53/90 422/172 |

FOREIGN PATENT DOCUMENTS

| DE | 102009061063 A1 | 6/2011 |
| WO | 0213951 A1 | 2/2002 |

* cited by examiner

*Primary Examiner* — Jorge Leon, Jr.
(74) *Attorney, Agent, or Firm* — Laurence A. Greenberg; Werner H. Stemer; Ralph E. Locher

(57) ABSTRACT

A delivery unit for a liquid additive includes a block having at least three ducts, at least one active component mounted on the block for delivering the liquid additive, a cylindrical collecting chamber into which the at least three ducts open, and a deformable, sleeve-shaped element disposed in the collecting chamber. A motor vehicle having a delivery unit is also provided.

11 Claims, 3 Drawing Sheets

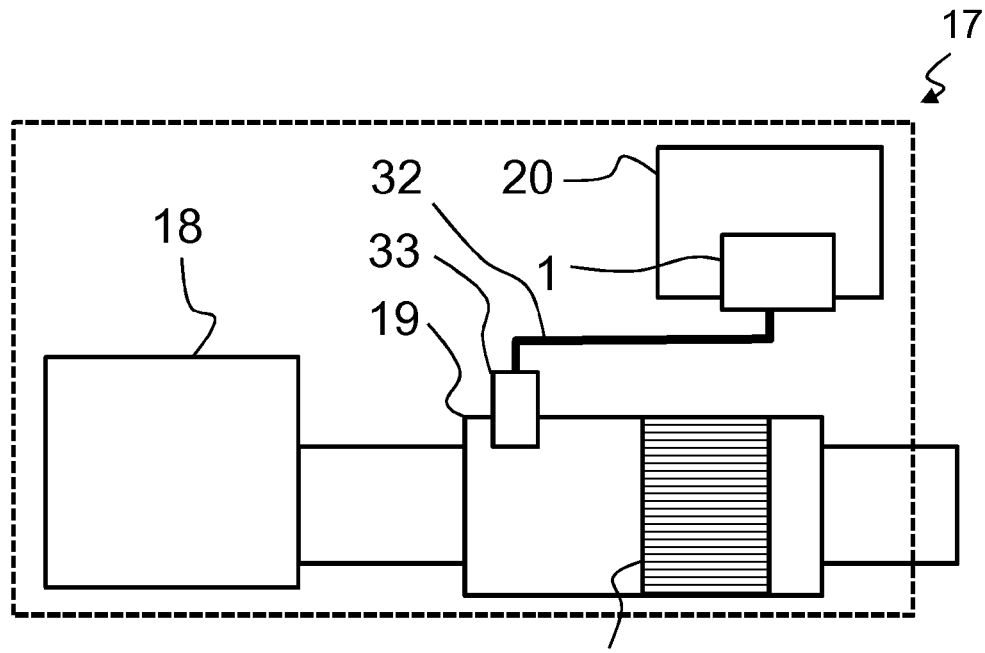
Fig. 6
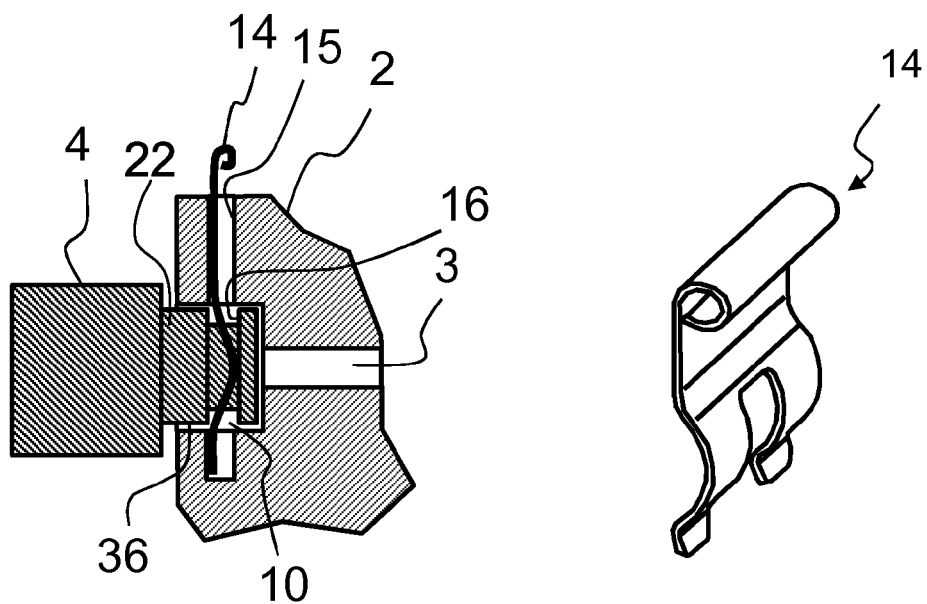
Fig. 7  Fig. 8

DELIVERY UNIT FOR A LIQUID ADDITIVE AND MOTOR VEHICLE HAVING A DELIVERY UNIT

CROSS-REFERENCE TO RELATED APPLICATION

This is a continuation, under 35 U.S.C. §120, of copending International Application No. PCT/EP2013/069543, filed Sep. 20, 2013, which designated the United States; this application also claims the priority, under 35 U.S.C. §119, of German Patent Application DE 10 2012 108 942.6, filed Sep. 21, 2012; the prior applications are herewith incorporated by reference in their entirety.

BACKGROUND OF THE INVENTION

Field of the Invention

The invention relates to a delivery unit for delivering a liquid additive. The delivery unit may be used, for example, in a motor vehicle to supply a liquid additive to an exhaust-gas treatment device. The invention also relates to a motor vehicle having a delivery unit.

In particular, in the case of motor vehicles with diesel internal combustion engines, a reducing agent is supplied to exhaust-gas treatment devices as a liquid additive for the purification of exhaust gases of the internal combustion engine. An exhaust-gas purification method particularly widely used in such exhaust-gas treatment devices is the method of selective catalytic reduction (SCR method). In that method, nitrogen oxide compounds in the exhaust gas of the internal combustion engine are converted with ammonia to form non-harmful substances such as water ($H_2O$), nitrogen ($N_2$) and $CO_2$. Ammonia is normally not stored in motor vehicles directly but rather in the form of a precursor solution which can be supplied as liquid additive to the exhaust-gas treatment device A 32.5% urea-water solution, which is also available under the trademark AdBlue® may be used as a precursor solution.

A delivery unit such as described herein is provided for the provision of a liquid additive in a motor vehicle. It is a problem for such a delivery unit that typical liquid additives (such as, for example, the described urea-water solution) freeze at low temperatures. AdBlue® freezes, for example, at approximately −11° C. Such temperatures may arise during long periods of standstill during operation of the motor vehicle. When the liquid additive freezes, a volume expansion occurs which can damage the delivery unit. A delivery unit should therefore be constructed in such a way that it is not damaged by liquid additive expanding as it freezes.

Furthermore, a delivery unit for liquid additive should be as inexpensive as possible to produce and should have the greatest possible dosing accuracy and as long a service life as possible.

SUMMARY OF THE INVENTION

It is accordingly an object of the invention to provide a delivery unit for a liquid additive and a motor vehicle having a delivery unit, which overcome the hereinafore-mentioned disadvantages and solve the highlighted technical problems of the heretofore-known units and vehicles of this general type. It is sought, in particular, to disclose an especially cost-saving delivery unit for a liquid additive, in which the delivery unit is capable of withstanding freezing of liquid additive.

With the foregoing and other objects in view there is provided, in accordance with the invention, a delivery unit for a liquid additive, comprising a block with ducts, at least one active component mounted on the block for delivering the liquid additive, a cylindrical collecting chamber into which at least three ducts in the block open, and a deformable, sleeve-shaped element disposed in the collecting chamber.

The block preferably constitutes a type of (separate) base structure on which all of the components of the delivery unit are mounted. The block has ducts which connect the individual active components of the delivery unit in liquid-conducting fashion. The ducts may be formed in the block as cutouts and/or as bores. In this case, "active components" means all components which perform an active function in the delivery of the liquid additive by using the delivery unit. The most important active component of a delivery unit is typically a pump which delivers and/or doses the liquid additive. Further active components are, for example, valves which control the provision or the delivery of the liquid additive, sensors which monitor the operation of the delivery unit and/or the properties of the liquid additive, and/or ice pressure compensation elements which permit a defined deformation when the liquid additive in the delivery unit freezes. The active components are preferably mounted on the block from the outside in such a way that they adjoin the ducts in the block and are connected to one another through ducts in the block.

The ducts (in particular all of the ducts) in the block of the described delivery unit open into a substantially cylindrical collecting chamber. The collecting chamber is formed preferably as a recess or as a bore in the block, the recess or bore extending into the block from an outer side. The collecting chamber is distinguished in particular in that it has a considerably larger or widened cross section in relation to the ducts. Even though a cylindrical shape is specified herein for describing the basic form of the collecting chamber, a form which deviates (slightly) therefrom may also be selected which may, for example, have chamfers, grooves, local widened/narrowed portions. The diameter of the collecting chamber is preferably at least twice as large, and particularly preferably at least three times as large, as the mean diameter of the ducts in the block.

A circular opening, proceeding from which the collecting chamber extends into the block, is preferably provided on the surface of the block. A deformable, sleeve-shaped element is (preferably completely) situated in the collecting chamber. In this case, the collecting chamber and the element preferably correspond in form in such a way that a substantially uniform annular gap is formed between them. The deformable, sleeve-shaped element is preferably inserted into the cylindrical collecting chamber proceeding from the described opening. The deformable, sleeve-shaped element preferably has at least one sealing lip which seals off the collecting chamber with respect to an environment of the block. It is preferable for all of the ducts in the block to flow into the collecting chamber. Ducts are preferably provided in the block, which connect each individual active component on the block to the collecting chamber. It is preferable if there are no branches of the ducts in the block at a distance from the collecting chamber. It is preferable for all of the ducts in the block to be connected to one another (only) through the collecting chamber. The collecting chamber preferably constitutes the central connection of all of the ducts in the block. At least three ducts therefore open into the collecting chamber. One duct is connected to a pump (pump duct). One duct (inlet duct) is connected to a line connection at which the delivery unit provides liquid additive (from a tank). One further duct (outlet duct) is connected, for example, to a return valve or to a sensor. In a preferred embodiment, even at least four ducts open into the collecting chamber.

This configuration of the delivery unit makes it possible for a freezing induced volume expansion of the liquid additive which occurs in the ducts in the block of the delivery unit to be directed through the ducts proceeding from the active components, predominantly or even always in the direction of the collecting chamber. In this way, during freezing, liquid additive is present in the collecting chamber until the last, and in the collecting chamber, the volume expansion of the liquid additive can be introduced into the sleeve-shaped element in an effective manner. This permits particularly effective, reliable and inexpensive compensation of the ice pressure during the freezing of the liquid additive in the delivery unit. In particular, dangerous increases in pressure in the region of the ducts or close to the active components are prevented in this way.

In accordance with another advantageous feature of the delivery unit of the invention, the sleeve-shaped element expands due to elastic stresses when the delivery unit is deactivated, and the sleeve-shaped element thus displaces liquid additive out of the collecting chamber.

In the event of a deactivation of the delivery unit, the pressure of the additive in the ducts is reduced because the active components do not maintain the pressure in the ducts. During the operation of the delivery unit, an operating pressure of, for example, between 3 bar and 9 bar prevails in the ducts. The operating pressure is generated by a pump (as an active component). The pressure falls, for example, because the pump is shut down upon the deactivation of the delivery unit. It is also possible that, upon the deactivation, a valve is opened which opens up a flow path from the ducts back into a tank. Such a valve is preferably a return valve which opens up a return line. The opening of such a valve also results in a pressure drop in the delivery unit.

A return line is typically a flow path through at least one duct, in such a way that a circulation of liquid additive from the tank, through the delivery unit and back into the tank is possible. Such circulation is advantageous, in particular, in order to convey air bubbles in the liquid additive out of the delivery unit. The return line preferably branches off from a delivery path for the liquid additive downstream of the pump. The delivery path typically denotes the path of the liquid additive from an extraction point at the tank to a consumer such as, for example, a feed device for feeding the additive to an exhaust-gas treatment device. The return line may be opened up and/or closed off by the described return valve in order to selectively permit or prevent circulation through the return line.

Due to the decreasing pressure in the delivery unit and/or in the ducts and in the collecting chamber in the event of a deactivation, the sleeve-shaped element can thus preferably expand and relax. The sleeve-shaped element is accordingly preferably compressed, or pressed against a surface, during operation of the delivery unit in order to be able to (automatically) expand upon the deactivation of the delivery unit. During the expansion of the sleeve-shaped element, the sleeve-shaped element preferably displaces liquid additive out of the collecting chamber. In this case, the liquid additive is displaced preferably through a described return line and back into the tank. It is additionally or alternatively possible for the liquid additive to be displaced back into the tank counter to the normal delivery direction.

The displacement of the liquid additive out of the collecting chamber results in space being created in the collecting chamber upon the deactivation of the delivery unit, which space can be utilized in the event of freezing to accommodate an expansion of the liquid additive during the freezing process. In this case, the space is in particular a space which is assigned to the sleeve-shaped element, preferably an internal cavity.

In accordance with a further particularly advantageous feature of the delivery unit of the invention, the block is composed of a plastic material. A block composed of a plastic material is particularly low-priced and can be produced particularly simply in the desired shape with the cylindrical collecting chamber and the various ducts. The block composed of the plastic material is preferably produced by using an injection molding process. An injection molding process permits particularly cost-efficient production of the block.

In accordance with an added advantageous feature of the delivery unit of the invention, during operation of the delivery unit, at least one tubular first connecting chamber which is filled with liquid additive exists in the collecting chamber between the block and the sleeve-shaped element.

In this case, the operation of the delivery unit means an operating mode in which the liquid additive in the collecting chamber and in the ducts is under (operation) pressure. The collecting chamber preferably has a first (inner) diameter. The sleeve-shaped element preferably has a second diameter which constitutes an outer diameter of the sleeve-shaped element. In this case, the second diameter is preferably smaller than the first diameter, and the sleeve-shaped element is preferably disposed concentrically in the collecting chamber. A tubular connecting chamber (in the form of an annular gap) which is thus formed between the sleeve-shaped element and the wall of the collecting chamber forms the tubular first connecting chamber. The various ducts in the block open into the collecting chamber, and therefore into the tubular first connecting chamber, at inflows.

The tubular first connecting chamber, which is delimited by the collecting chamber and the sleeve-shaped element, realizes the fluidic connection between the individual ducts in the block. It is possible for not only a first tubular connecting chamber to exist in the collecting chamber. It is also possible for an additional second tubular connecting chamber to exist. The second tubular connecting chamber may be delimited with respect to the first connecting chamber by using a sealing lip on the sleeve-shaped element. The first connecting chamber can then produce a fluidic connection between a first group of ducts in the block, while the second connecting chamber produces a fluidic connection between a second group of ducts in the block. The first connecting chamber and the second connecting chamber can be fluidically separated from one another by using a substantially annular sealing lip disposed on the sleeve-shaped element. In this case, the outer diameter of the sealing lip preferably corresponds to the diameter of the cylindrical collecting chamber, in order to ensure that the sealing lip realizes sealing of the first connecting chamber with respect to the second connecting chamber within the cylindrical collecting chamber. If multiple connecting chambers are formed by the collecting chamber and the sleeve-shaped element, the connecting chambers are, in particular, disposed adjacent one another in the direction of axial extent of the collecting chamber or sleeve-shaped element and separated by partition ridges on the inner wall of the collecting chamber and/or sealing lips on the outer surface of the sleeve-shaped element. The multiple connecting chambers may differ from one another, in particular, with regard to their dimensions (inner diameter, outer diameter, axial length) and thus accommodate different volumes of the liquid additive.

In accordance with an additional feature of the delivery unit of the invention, the sleeve-shaped element is preferably formed from an elastic plastic.

The sleeve-shaped element is very particularly preferably composed of a rubber material. Such a material is particularly suitable for accommodating expansions of the liquid additive in the event of freezing, by using a deformation. It is self-evident that a material should be selected in this case which is correspondingly rigid/deformable at the prevailing pressures and which is also resistant to the liquid additive.

In accordance with yet another particularly preferable feature of the delivery unit of the invention, a stiffening structure is disposed in an interior space of the sleeve-shaped element, and a wall of the stiffening structure bears against the sleeve-shaped element during operation in such a way that the sleeve-shaped element is stiffened during operation.

In this case, operation means, in particular, a mode in which a delivery of liquid additive by using the delivery unit takes place, and the operating pressure described further above prevails in the ducts in the block and/or in the cylindrical collecting chamber. The sleeve-shaped element is compressed by the pressure. Since the sleeve-shaped element is composed preferably of an elastic plastic material or even of a rubber material, the sleeve-shaped element would be compressed to an ever greater extent with rising pressure in the collecting chamber and in the ducts. Through the use of a stiffening structure within an interior space of the sleeve-shaped element, it can be ensured that the sleeve-shaped element (ultimately after a desired shrinkage/compression) is pressed against the stiffening structure when the pressure in the collecting chamber reaches a threshold pressure. In this way, the sleeve-shaped element is only very slightly deformed further, or no further, with further rising pressure.

In this way, it is made possible for the sleeve-shaped element to exhibit substantially rigid behavior in the range of the operating pressure. A deformation of the sleeve-shaped element in the range of the operating pressure could impair the dosing accuracy of the delivery unit. Specifically, that could have the result that it is not possible to precisely detect whether the liquid additive has actually been dispensed/delivered at the line connector or has merely led to a deformation of the sleeve-shaped element. It is precisely that which can be prevented by using the described stiffening structure.

The sleeve-shaped element is preferably in the form of a rubber pipe stub which is closed off at one side, or a cap. The sleeve-shaped element thus has an opening opposite the described closed-off side. The sleeve-shaped element is preferably disposed in the collecting chamber in such a way that the opening extends to an outer side of the block. The stiffening structure can be inserted into the sleeve-shaped element through the opening.

In accordance with yet a further particularly preferable feature of the delivery unit of the invention, the stiffening structure is in the form of a slotted sleeve which is inserted into the interior space of the sleeve-shaped element. The stiffening structure may additionally have a structure which is used to fix the stiffening structure in the sleeve-shaped element. In this way, the stiffening structure may possibly also be deformed to a certain degree, for example until the slot has closed, and then exhibit rigid behavior. Such a slotted sleeve can be gripped by using a tool (for example pliers) and compressed and inserted into the interior space of the sleeve-shaped element. The stiffening structure serves, in particular, to prevent the sleeve-shaped element from collapsing, or being flattened, in the event of high pressure prevailing in the collecting chamber and/or in the ducts.

In accordance with yet an added advantageous feature of the delivery unit of the invention, channels are formed on the outer side of the sleeve-shaped element, in such a way that the channels can form fluidic connections between the ducts in the block.

The channels are preferably not the only fluidic connection between the ducts in the block. It is preferable for the at least one described tubular connecting chamber to also be provided in such a way that the connecting chamber connects ducts to one another. The channels constitute, for example, an enlargement of the tubular connecting chamber in sections, in which the enlargement permits an improved flow of liquid additive between the individual ducts in a targeted manner. The channels thus run preferably only within a single connecting chamber, and/or the channels are interrupted by the partition ridges/sealing lips. It is preferable for only a small number of such channels to be provided, for example 2, 3, 4 or 5.

In accordance with yet an additional advantageous feature of the delivery unit of the invention, the at least one active component is braced in a receptacle of the block by using a clamping plate, wherein the block has a slot through which the clamping plate is inserted laterally into the receptacle and engages into a groove on the active component.

In this case, a connector concept is described through the use of which active components can be connected to a block of a delivery unit. The connector concept is advantageous, in particular, for delivery units with a block composed of plastic.

The groove constitutes, in particular, a tapering of a connector of the active component. As a result of the insertion of the clamping plate, a constriction is formed in the receptacle, in such a way that the connector of the active component is held fixed in the receptacle. The clamping plate preferably has a curvature in such a way that it is under stress in the slot on the block and in the groove of the active component, and braces the active component in the receptacle. Such a delivery unit with an active component coupled by using a clamping plate may be combined as desired with all other features disclosed in this document.

With the objects of the invention in view, there is concomitantly provided a motor vehicle, comprising an internal combustion engine, an exhaust-gas treatment device for the purification of the exhaust gases of the internal combustion engine, a tank for storing a liquid additive, and a described delivery unit for delivering the liquid additive from the tank into the exhaust-gas treatment device. The exhaust-gas treatment device preferably has an SCR catalytic converter in which the SCR process can be carried out in order to reduce nitrogen oxide compounds in the exhaust gas. The liquid additive delivered by the delivery unit is metered in a dosed fashion into the exhaust-gas treatment device, preferably by using an injector.

Other features which are considered as characteristic for the invention are set forth in the appended claims, noting that the features specified individually in the claims may be combined with one another in any desired technologically meaningful way and may be supplemented by explanatory facts from the description, with further embodiments of the invention being specified.

Although the invention is illustrated and described herein as embodied in a delivery unit for a liquid additive and a motor vehicle having a delivery unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 6 is a block diagram of a motor vehicle having a delivery unit as described herein;

FIG. 7 is a fragmentary, sectional view illustrating a connection of an active component to a block; and FIG. 8 is a perspective view of a clamping plate for the connection illustrated in FIG. 7.

DETAILED DESCRIPTION OF THE INVENTION

Figure 1:
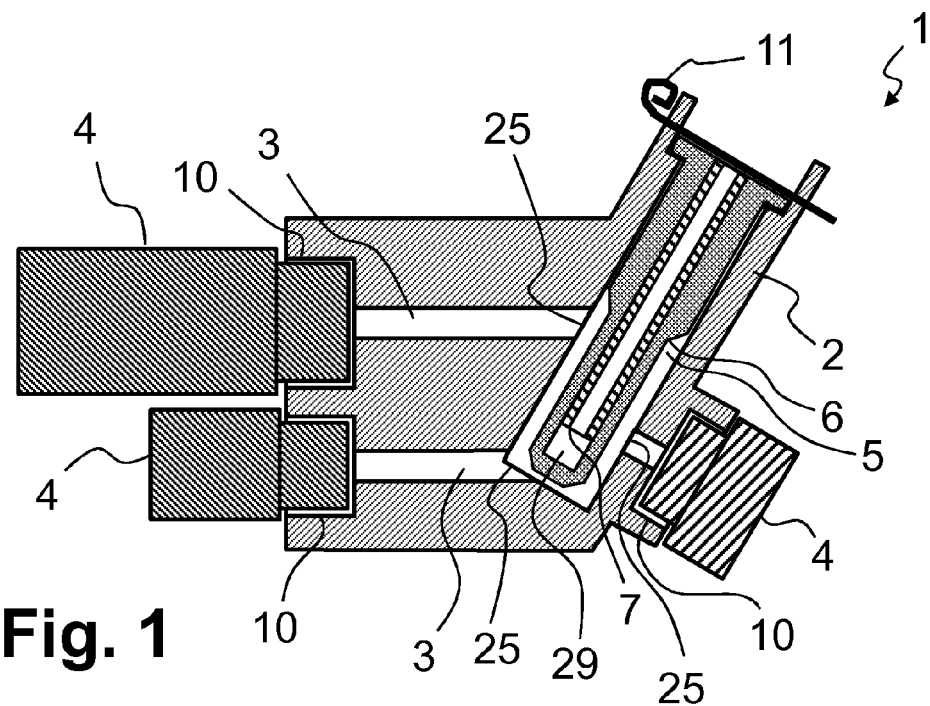
FIG. 1 is a diagrammatic, vertical-sectional view of a delivery unit as described herein.

Referring now in detail to the figures of the drawing for explaining the invention and the technical field in more detail by showing particularly preferred structural variants to which the invention is not restricted and in which proportions are diagrammatic, and first, particularly, to FIG. 1 thereof, there is seen a block 2 of a delivery unit 1. Ducts 3, which are disposed in the block 2, open into a collecting chamber 5 in the block 2. The ducts 3 each connect one respective receptacle 10 for an active component 4 to the collecting chamber 5. The ducts 3 open into the collecting chamber 5 at inflows 25. A total of three ducts 3 which are illustrated therein each open into the collecting chamber 5 at a separate inflow 25. A sleeve-shaped element 6, which is disposed in the collecting chamber 5, is stiffened by a stiffening structure 7. The sleeve-shaped element 6 has an interior space 29 in which the stiffening structure 7 is disposed. The sleeve-shaped element 6 is fixed to the block 2 by a locking pin 11.

Figures 2, 3:
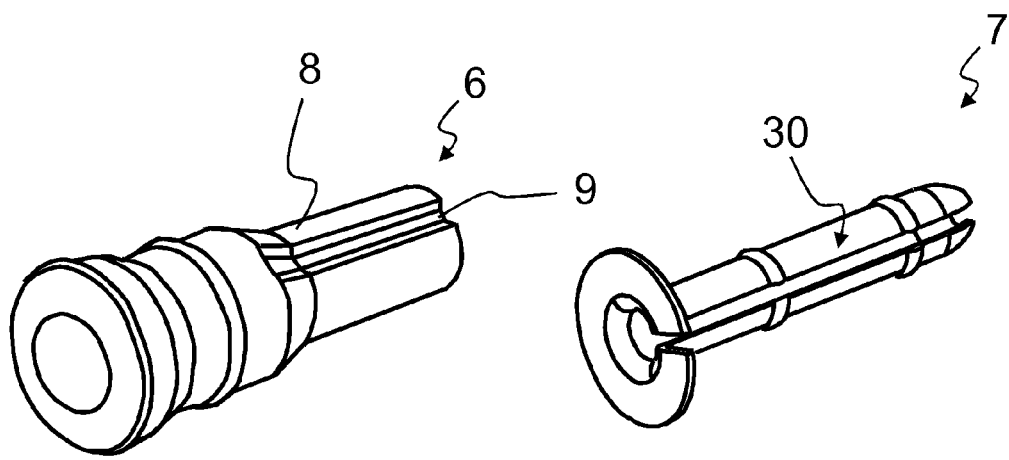
FIG. 2 is a perspective view of a sleeve-shaped element for a delivery unit as described herein.
FIG. 3 is a perspective view of a stiffening structure for a sleeve-shaped element.

FIG. 2 shows a sleeve-shaped element 6 for the delivery unit according to FIG. 1. The sleeve-shaped element 6 has a channel 9 on its outer side 8. The channel 9 can provide an improved flow path within the collecting chamber 5 between two inflows of ducts 3 in the block 2, because the space provided in the collecting chamber for the flow of fluid is locally enlarged by the channel 9.

FIG. 3 shows a stiffening structure 7 which can be inserted into a sleeve-shaped element 6. The stiffening structure 7 is formed in this case as a slotted sleeve or insert which can be inserted into an interior space of the sleeve-shaped element 6 through an opening of the sleeve-shaped element. The stiffening structure 7 has a wall 30 or a surface against which the sleeve-shaped element bears when an operating pressure prevails in the collecting chamber 5 during operation of the delivery unit. In this way, the stiffening structure 7 stiffens the sleeve-shaped element during operation. When the pressure in the collecting chamber decreases after a deactivation of the delivery unit, the sleeve-shaped element expands and bears, if appropriate, only loosely against the wall 30.

Figure 4:
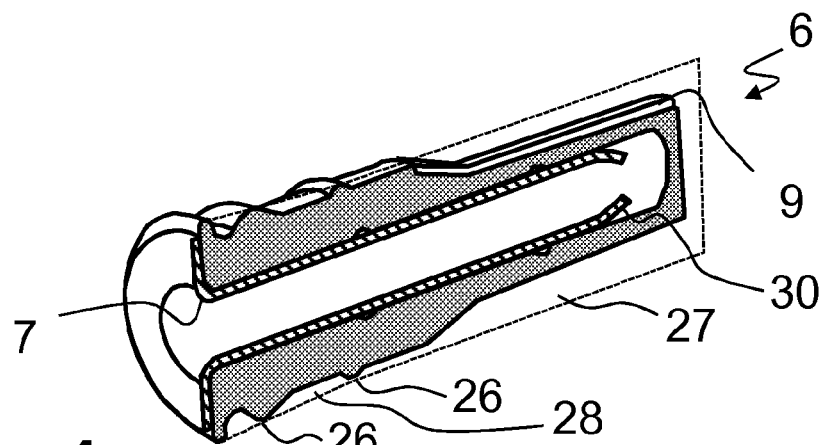
FIG. 4 is a longitudinal section through a perspective view of a sleeve-shaped element with a stiffening structure inserted therein.

FIG. 4 shows a cross section through a sleeve-shaped element 6 with a stiffening structure 7 inserted therein. The stiffening structure 7 is inserted into the interior space 29 of the sleeve-shaped element 6. During operation of the delivery unit, the sleeve-shaped element 6 bears with its inner side against the wall 30 of the stiffening structure 7. The sleeve-shaped element 6 has sealing lips 26 which can bear against the block 2 of a delivery unit 1 when the sleeve-shaped element 6 is inserted into the collecting chamber 5 in the block. The sealing lips 26 are constructed to seal off against a surface of the collecting chamber. In this case, a first connecting chamber 27 and a second connecting chamber 28 are delimited with respect to one another by the sealing lips 26. Ducts in the block can open into the collecting chamber either in the region of the first connecting chamber 27 or in the region of the second connecting chamber 28. The first connecting chamber 27 and the second connecting chamber 28 are separated from one another by a sealing lip 26. Ducts which open into the first connecting chamber 27 are therefore connected only to ducts which likewise open into the first connecting chamber 27. Ducts which open only into the second connecting chamber 28 are accordingly connected only to ducts which likewise open into the second connecting chamber 28.

Figure 5:
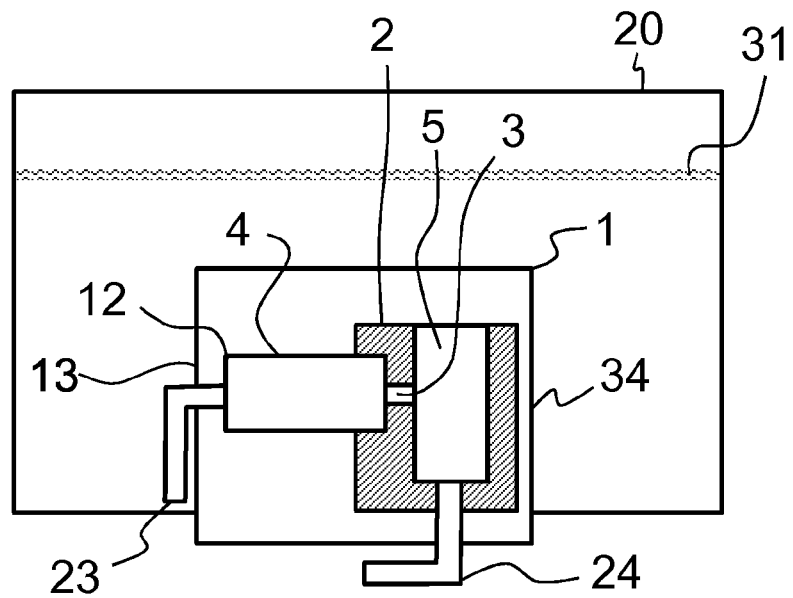
FIG. 5 is a block diagram of a tank for a liquid additive, in which the tank has a delivery unit as described herein inserted therein.

FIG. 5 shows a tank 20 in which a delivery unit 1 is disposed. The delivery unit 1 has a housing 13 which is inserted into a base of the tank 20. A liquid level 31 is shown in the tank 20. The block 2 with the ducts 3 and the collecting chamber 5 is situated within the housing 13. In this case, a pump 12 is illustrated as an active component 4 on the block 2. The pump 12 extracts liquid additive from the tank at a suction point 23 and delivers the liquid additive through the ducts 3 in the block 2 to a line connector 24, to which a fluid line for conducting the liquid additive to a consumer can be connected.

FIG. 6 shows a motor vehicle 17 having an internal combustion engine 18 and an exhaust-gas treatment device 19 for the purification of exhaust gases of the internal combustion engine 18. The method of selective catalytic reduction can be carried out by using an SCR catalytic converter 35 provided in the exhaust-gas treatment device 19. For this purpose, a liquid additive can be supplied to the exhaust-gas treatment device 19 by an injector 33. The injector 33 is supplied with the liquid additive through a supply line 32 from a delivery unit 1 which extracts the liquid additive from a tank 20.

FIG. 7 shows one possibility for the connection of an active component 4 to a duct 3 in a block 2 of a delivery unit. Only a section of the block 2 is illustrated therein. The block 2 has a receptacle 10 into which the duct 3 opens and into which a connector 22 of the active component 4 can be inserted. The active component 4 or the connector 22 of the active component 4 has a groove 16. A clamping plate 14 can be inserted through a slot 15 in the block 2. The clamping plate engages into the groove 16 of the active component 4 and thus fixes the active component 4 to the block at the receptacle 10.

The clamping plate 14 of FIG. 7 is illustrated again in detail in FIG. 8. It can be seen that the clamping plate has two arms, between which the groove 16 of the active component 4 with its connector 22 in the receptacle is seated, and the clamping plate 14 is inserted into the slot or the block.

The delivery unit described herein is especially tough and durable, in particular even if the liquid additive to be delivered regularly freezes in the delivery unit.

The invention claimed is:
1. A delivery unit for a liquid additive, the delivery unit comprising:
a block having at least three ducts formed therein;
at least one active component mounted on said block for delivering the liquid additive;

a cylindrical collecting chamber, said at least three ducts opening into said cylindrical collecting chamber;
a deformable, sleeve-shaped element disposed in said collecting chamber; and
a stiffening structure inserted in an interior space of said sleeve-shaped element, said stiffening structure having a wall bearing against said sleeve-shaped element and stiffening said sleeve-shaped element during operation of the delivery unit.

2. The delivery unit according to claim 1, wherein said sleeve-shaped element expands due to elastic stresses when the delivery unit is deactivated causing said sleeve-shaped element to displace liquid additive out of said collecting chamber.

3. The delivery unit according to claim 1, wherein said block is composed of a plastic material.

4. The delivery unit according to claim 1, which further comprises at least one tubular first connecting chamber provided in said collecting chamber between said block and said sleeve-shaped element and being filled with liquid additive during operation of the delivery unit.

5. The delivery unit according to claim 1, wherein said sleeve-shaped element is composed of an elastic plastic.

6. The delivery unit according to claim 1, wherein said stiffening structure is a slotted sleeve inserted into said interior space of said sleeve-shaped element.

7. A delivery unit for a liquid additive, the delivery unit comprising:
a block having at least three ducts formed therein;
at least one active component mounted on said block for delivering the liquid additive;
a cylindrical collecting chamber, said at least three ducts opening into said cylindrical collecting chamber; and
a deformable, sleeve-shaped element disposed in said collecting chamber, said sleeve-shaped element having an outer side with channels formed therein, and said channels forming fluidic connections between said ducts in said block.

8. A delivery unit for a liquid additive, the delivery unit comprising:
a block having at least three ducts, a receptacle and a slot formed therein;
at least one active component mounted on said block for delivering the liquid additive, said at least one active component having a groove formed therein;
a cylindrical collecting chamber, said at least three ducts opening into said cylindrical collecting chamber;
a deformable, sleeve-shaped element disposed in said collecting chamber; and
a clamping plate inserted through said slot in said block laterally into said receptacle in said block, engaging into said groove of said at least one active component and bracing said at least one active component in said receptacle.

9. A motor vehicle, comprising:
an internal combustion engine;
an exhaust-gas treatment device for purification of exhaust gases of said internal combustion engine;
a tank for storing a liquid additive; and
a delivery unit for delivering the liquid additive from said tank into said exhaust-gas treatment device, said delivery unit including:
a block having at least three ducts formed therein;
at least one active component mounted on said block for delivering the liquid additive;
a cylindrical collecting chamber, said at least three ducts opening into said cylindrical collecting chamber;
a deformable, sleeve-shaped element disposed in said collecting chamber; and
a stiffening structure inserted in an interior space of said sleeve-shaped element, said stiffening structure having a wall bearing against said sleeve-shaped element and stiffening said sleeve-shaped element during operation of the delivery unit.

10. A motor vehicle, comprising:
an internal combustion engine;
an exhaust-gas treatment device for purification of exhaust gases of said internal combustion engine;
a tank for storing a liquid additive; and
a delivery unit for delivering the liquid additive from said tank into said exhaust-gas treatment device, said delivery unit including:
a block having at least three ducts formed therein;
at least one active component mounted on said block for delivering the liquid additive;
a cylindrical collecting chamber, said at least three ducts opening into said cylindrical collecting chamber; and
a deformable, sleeve-shaped element disposed in said collecting chamber, said sleeve-shaped element having an outer side with channels formed therein, and said channels forming fluidic connections between said ducts in said block.

11. A motor vehicle, comprising:
an internal combustion engine;
an exhaust-gas treatment device for purification of exhaust gases of said internal combustion engine;
a tank for storing a liquid additive; and
a delivery unit for delivering the liquid additive from said tank into said exhaust-gas treatment device, said delivery unit including:
a block having at least three ducts, a receptacle and a slot formed therein;
at least one active component mounted on said block for delivering the liquid additive, said at least one active component having a groove formed therein;
a cylindrical collecting chamber, said at least three ducts opening into said cylindrical collecting chamber;
a deformable, sleeve-shaped element disposed in said collecting chamber; and
a clamping plate inserted through said slot in said block laterally into said receptacle in said block, engaging into said groove of said at least one active component and bracing said at least one active component in said receptacle.

* * * * *